United States Patent [19]

McDowell

[11] Patent Number: 5,277,154
[45] Date of Patent: Jan. 11, 1994

[54] OIL/AIR SEPARATOR AND METHOD THEREOF

[76] Inventor: Alex R. McDowell, Rte. 1, Box 1750, Hartwell, Ga. 30643

[21] Appl. No.: 948,407

[22] Filed: Sep. 21, 1992

[51] Int. Cl.$^5$ ............................................. F01M 13/00
[52] U.S. Cl. ................................... 123/41.86; 123/573
[58] Field of Search ............................. 123/41.86, 573

[56] References Cited

U.S. PATENT DOCUMENTS

| | | | |
|---|---|---|---|
| 1,682,998 | 9/1928 | Sommers | 123/41.86 |
| 3,875,916 | 4/1975 | Patton | 123/572 |
| 4,082,071 | 4/1978 | Jones | 123/572 |
| 4,089,309 | 5/1978 | Bush | 123/572 |
| 4,269,607 | 5/1981 | Walker | 123/573 |
| 4,370,971 | 2/1983 | Bush | 123/573 |
| 4,409,950 | 10/1983 | Goldberg | 123/573 |
| 4,453,525 | 6/1984 | DeBruler | 123/573 |
| 4,569,323 | 1/1986 | Okumura | 123/572 |
| 5,046,474 | 9/1991 | Percy | 123/573 |

Primary Examiner—Noah P. Kamen
Attorney, Agent, or Firm—Hopkins & Thomas

[57] ABSTRACT

An oil/air separator (10) condenses and collects oil vapors carried by blow-by gases from the crankcase of an internal combustion engine. The oil/air separator comprises an inlet vent (17), an outlet vent (56), a first filter means (32), a second filter means (34), a third filter means (44), an oil collection chamber (28), an excess oil return line (64), and a drain plug (61). The integrity of the combustion chamber in preventing air/fuel vapors and exhaust gases from passing into the crankcase can be determined by the amount of accumulated oil (62) in the collection chamber.

9 Claims, 3 Drawing Sheets

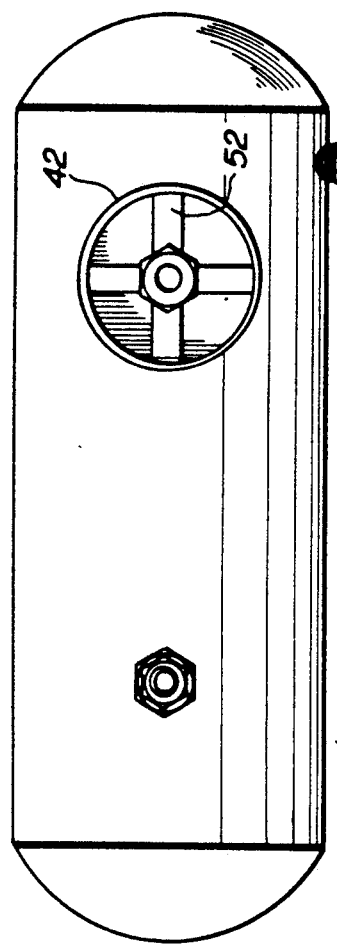
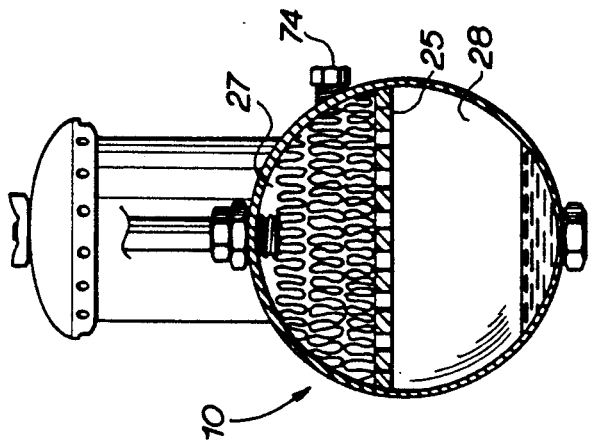

OIL/AIR SEPARATOR AND METHOD THEREOF

FIELD OF THE INVENTION

The present invention generally relates to new and useful improvements in a blow-by gas ventilation system for the crankcase of an internal combustion engine and, more particularly, to an oil/air separator and method thereof.

BACKGROUND OF THE INVENTION

During normal operation of an internal combustion engine, a small portion of the air fuel mixture fed to the engine cylinders passes by the pistons and the piston rings into the crankcase before combustion occurs. Also, after combustion of the air fuel mixture in the combustion cylinders, combustion exhaust gases are forced past the piston rings into the crankcase. The unburned air fuel vapor mixture and combustion exhaust gases include water vapor, oil vapor, carbon dioxide, carbon monoxide, and soot combustion materials and are collectively called "blow-by" gases. The blow-by gases occur due to a breakdown in the integrity of the combustion chamber, primarily caused by damage or prolonged wear to the piston rings during operation cycles. However, blow-by gases can also occur from damage to the pistons, the combustion cylinder walls, or the valve guides and valve stems, which, for simplification, shall collectively be referred to as the combustion chamber.

The releasing of such vapors and gases from the crankcase into the ambient atmosphere is a direct cause of the oil residue that collects along roadways. To reduce the emission of blow-by gases to the atmosphere, many types of engines employ a positive crankcase ventilation (PCV) system, wherein engine blow-by gases are recycled back into the air fuel induction system of the engine. However, in certain engines, particularly in diesel engines and internal combustion engines employing fuel injection, a PCV system is not entirely advantageous in terms of fuel efficiency and hydrocarbon exhaust reduction. In fact, many diesel engines vent their blow-by gases directly into the ambient atmosphere, thereby creating the oil residue seen on roadways.

An efficient method for reducing the formation of these blow-by gases is periodic inspection of the pistons and the piston rings for excessive wear or possible damage. However, inspection of these parts is an expensive process. Since the extent of blow-by gas formation in the crankcase is directly related to the integrity of the combustion chamber, a method and apparatus for measuring the extent of blow-by gas formation in the crankcase would provide a much less expensive means for gauging the performance of the combustion chamber, in general, and the piston rings, in particular, in preventing the formation of blow-by gases.

In addition, while PCV systems help minimize contamination of the oil lubrication system and can increase the fuel efficiency of internal combustion engines, they can create the potential for damage to the engine. In the event of a substantial leak within the combustion chamber caused by, for example, a blown piston ring, a burned piston, or a dropped valve, a substantial amount of the oil can be blown out of the crankcase. With a PCV system, this oil is routed to the air intake manifold and, eventually, burned along with the air-fuel mixture, depriving the lubrication system of needed oil, which could result in serious damage to the engine.

Accordingly, there is a heretofore unaddressed need in the industry for a method and apparatus for gauging the condition of the combustion chamber as well as preventing complete oil blow out upon damage to the pistons or the piston rings.

SUMMARY OF THE INVENTION

Briefly described, the present invention comprises an oil/air separator for an internal combustion engine wherein blow-by gases from the crankcase of the engine are filtered and vented to the atmosphere. Within the oil/air separator, blow-by gases are passed through a filter means wherein suspended oil and fuel droplets within the blow-by gases are collected and condensed into droplets of sufficient size to fall to the bottom of the separator and collect within a collection chamber.

The oil/air separator in the preferred embodiment comprises an elongated cylindrical housing structure that includes an inlet vent for receiving blow-by gases from the crankcase of the engine, an outlet vent for venting filtered blow-by gases to the ambient atmosphere, and a drain plug within the collection chamber for periodically draining accumulated oil therefrom. Within the housing, a primary filter chamber is defined in the upper portion of the housing adjacent the inlet vent. In the primary filter chamber, the blow-by gases are initially filtered, removing a substantial portion of the oil and other heavy particulate matter from the blow-by gases.

From the primary filter chamber, the filtered blow-by gases pass down into the collection chamber below the primary filter chamber and then up into a secondary filter chamber that is separated off from the primary filter chamber. Within the secondary filter chamber, the filtered blow-by gases receive a second stage of filtering by a more dense or finer filter material. Both the primary filter chamber and the secondary filter chamber are positioned in the upper portion of the housing above the collection chamber. Oil that is separated from the blow-by gases within both the primary filter chamber and the secondary filter chamber condenses and coalesces within the filter material into droplets of sufficient weight to drop from the filter chambers down into the collection chamber. The collection chamber is sized to hold a sufficient quantity of oil indicative of a significant blow-by gas formation problem within the crankcase.

Positioned above the secondary filter chamber is a third filter chamber comprising a series of vertically spaced frusto-conical, perforated filter plate baffles. Twice filter blow-by gases pass upwards from the secondary filter chamber through the third filter chamber before being vented from the upper portion of the third filter chamber to the ambient atmosphere.

Within the collection chamber of the housing, the separated oil is allowed to collect. The oil can be drained from the collection chamber via the drain plug. A mechanic or a car technician, by draining the oil from the collection chamber periodically, can gauge the performance of the pistons and the piston rings within the combustion chamber in order to determine the extent of blow-by gas formation within the crankcase.

In addition, an oil indicator line made of clear plastic is mounted at one end of the oil/air separator. The indicator line is connected to the bottom of the collection chamber to receive accumulated oil and provide a visual indication of the amount of oil in the collection chamber.

The oil/air separator is also provided with a return line from the collection chamber to the crankcase of the engine. The return line is connected to the collection chamber at a predetermined level above the bottom portion of the collection chamber in order to allow a predetermined amount of oil to collect in the collection chamber before it siphons off excess oil and returns the oil to the crankcase. The return line communicates with the crankcase at a level below the oil level of the crankcase.

Upon a significant breakdown in the performance of the pistons, the piston rings, or the valves, an excessive quantity of blow-by gases will be created in the crankcase and the compression from the engine cylinders will force the blow-by gases out the vent tube into the oil-/air separator, thereby causing an increased amount of oil to be collected in the collection chamber of the separator. The excess oil above the level of the return line in the collection chamber will be returned via the return line to the crankcase, thus preventing the expulsion of these oils into the ambient atmosphere.

Accordingly, it is an object of the present invention to provide an apparatus and method for gauging the formation of blow-by gases within the crankcase of an internal combustion engine.

Another object of the present invention is to provide an apparatus and method for preventing engine oil blow out upon damage to the piston rings or the combustion chamber.

Another object of the present invention is to provide an apparatus and method for separating the oil from the blow-by gases and returning the oil to the crankcase.

Another object of the present invention is to provide an apparatus and method for accumulating separated oil from the blow-by gases and gauging by the quantity of such oil the necessity for repair work on the combustion chamber.

Another object of the present invention is to provide a simple, inexpensive means for determining the amount of oil blown from the crankcase.

Another object of the present invention is to provide an apparatus and method for reducing the quantity of oil burned and exhausted upon damage to the piston rings or the combustion chamber.

Another object of the present invention is to provide an apparatus and method for filtering the blow-by gases that employs a filter means that is easily cleaned and/or replaced.

Another object of the present invention is to provide an apparatus and method for reducing the expulsion of blow-by gases containing substantial quantities of oil and fuel from the crankcase to the ambient atmosphere.

Another object of the present invention is to provide an apparatus and method for reducing the amount of oil residue build up along roadways.

Another object of the present invention is to provide an oil/air separator that is simple in design, efficient in operation, and durable in structure.

These and other objects, features, and advantages of the present invention shall become apparent from the following specification, when read in conjunction with the accompanying drawings.

BRIEF DESCRIPTION OF THE DRAWINGS

A better understanding of the present invention is realized upon consideration of the following drawings. The following drawings are not necessarily to scale, emphasis instead being placed upon clearly illustrating principles of the present invention.

FIG. 3 is a plan view of the oil/air separator of FIG. 1 with the cap of the third filter chamber removed.

FIG. 4 is a end elevational view of the oil/air separator shown in FIG. 1 with a portion of the separator cut away.

FIG. 5 is a sectional view of a portion of the oil/air separator disclosed in FIG. 1, and showing filter material interposed between the vertically spaced frusto-conical perforated filter plates.

DETAILED DESCRIPTION OF THE PREFERRED EMBODIMENT

Figure 1:
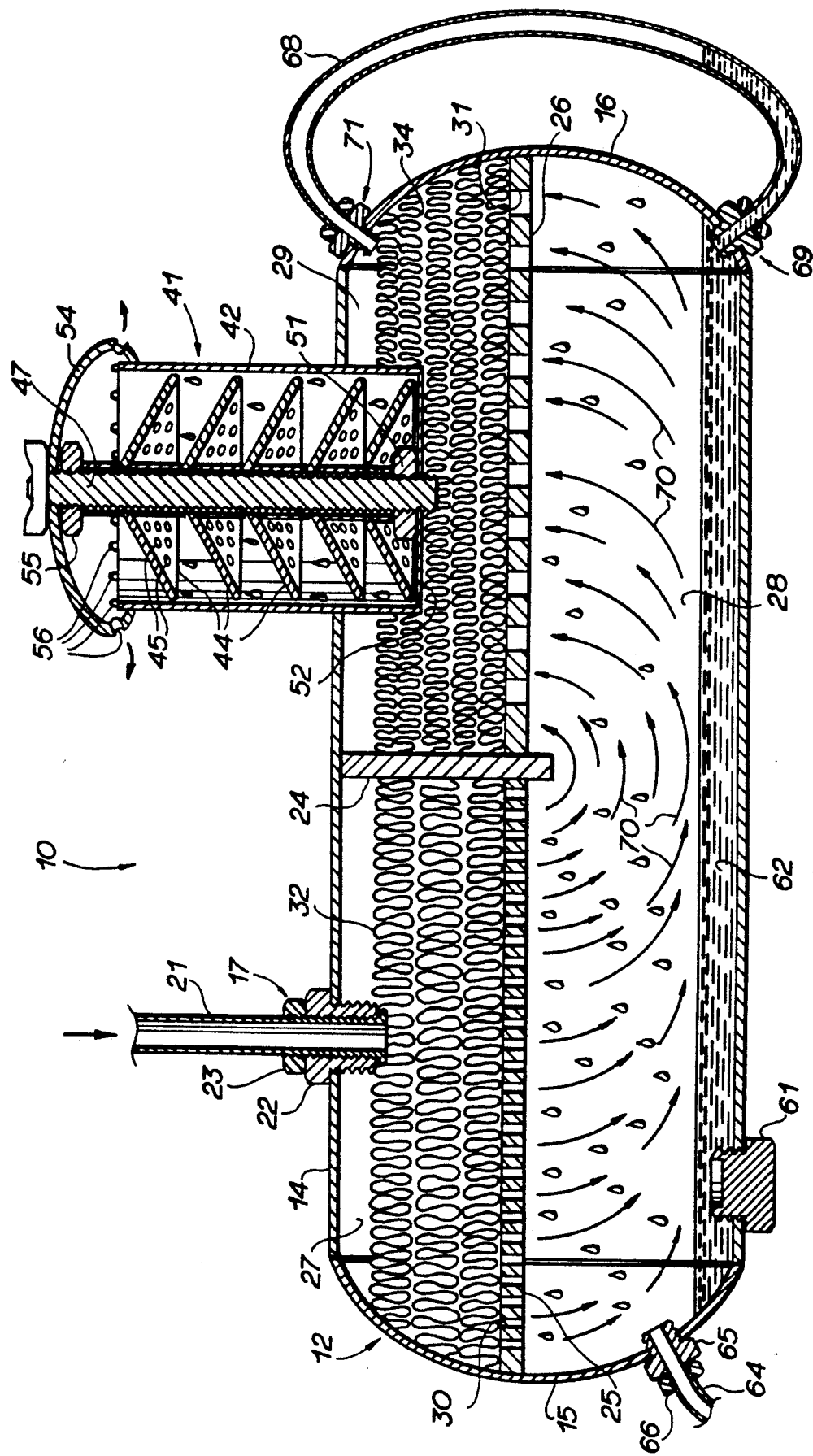
FIG. 1 is a sectional view of the oil/air separator constructed in accordance with a preferred embodiment of the present invention.

Referring now in more detail to the drawings, in which like reference numerals represent like parts throughout the several views, FIG. 1 illustrates the oil/air separator 10 that embodies the principles of the present invention in a preferred form. The oil/air separator 10 comprises an elongated cylindrical housing 12 having a cylindrical side wall 14 and two arcuate end caps 15, 16. A crankcase blow-by gas vent inlet 17 is located at the top portion of the housing 12 and comprises a vent tube 21 leading from the crankcase. The vent tube 21 is secured to the cylindrical side wall 14 via threaded bushing 22 and nut 23.

Figure 2:
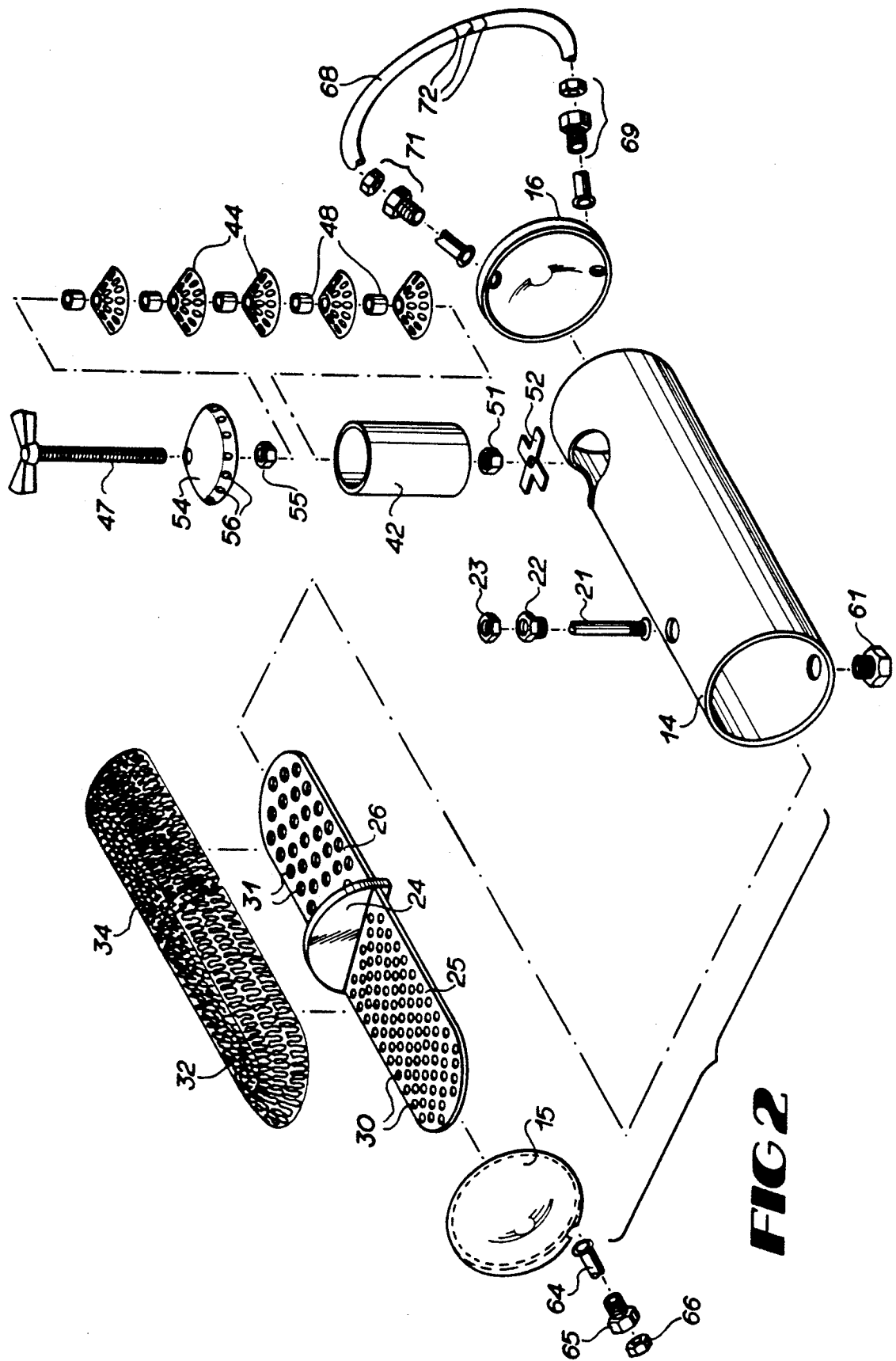
FIG. 2 is an exploded view of the oil/air separator of FIG. 1.

As best seen in FIG. 2, a semi-circular interior divider 24 extends from the top portion of the cylindrical side wall 14 down into the interior of the oil/air separator 10. A filter support means, comprising a first filter support plate 25 and a second filter support plate 26, spans the length of the interior of the oil/air separator 10. The filter support plates 25, 26, along with the divider 24, define within the interior of the oil/air separator 10 a first filter chamber 27 (see FIG. 1), a collection chamber 28, and a second filter chamber 29.

Both the first filter support plate 25 and the second filter support plate 26 include a multiplicity of respective perforations or holes 30, 31, with holes 30 in the first filter support plate 25 being smaller than the holes 31 in the second filter support plate 26. The divider 24 and the first and second filter support plates 25, 26 can be secured to each other and to the interior side wall 14 of the oil/air separator 10 by any conventional means, such as by welding.

Within the first filter chamber 27 resides a primary filter means 32, as shown in block form in FIG. 2. The primary filter means 32 can be comprised of any of the various fibrous material known in the art for filtering blow-by gases, for example, a packed stainless steel mesh. The primary filter means 32 is of sufficient quantity to occupy substantially all of the primary filter chamber 27. Within the secondary filter chamber 29, a secondary filter means 34, as shown in block form in FIG. 2. The secondary filter means 34 can be of a similar fibrous material as that of the primary filter means 32. However, the secondary filter means 34 should be of a denser or finer quality material, because it filters blow-by gases that have previously been filtered once by the primary filter means 32 and, hence contain lighter impurities. Again, the secondary filter means 34 is of sufficient size to occupy substantially the entire secondary filter chamber 29.

A third filter chamber 41 is positioned above the secondary filter chamber 29. The third filter chamber 41 comprises a vertical cylindrical housing 42, which extends from partially within the secondary filter chamber 29 to well above the cylindrical side walls 14. Preferably, the cylindrical housing 42 is welded within an opening at the top portion of the cylindrical side wall 14.

Within the vertical housing 42 of the third filter chamber 41, a series of vertically spaced filter plate baffles 44 are disposed to provide a third and final filtering stage for the blow-by gases. Each filter plate baffle 44 is a frusto-conically shaped baffle with a multiplicity of perforations or holes 45, and each filter plate baffle 44 has an opening at its top for receiving therethrough an elongated wing bolt 47. A series of spacers 48, also received on the wing bolt 47, provide the spacing for the frusto-conical filter plate baffle 44. Although not shown, a filter mesh material ban be provided between the spaced filter plate baffles to enhance the filtering action within the third filter chamber. A nut 51 and cross-shaped keeper 52 support the frusto-conical filter plate baffles 44 and spacers 48. A cap and air vent 54 tops off the third filter chamber 41 and is secured thereto via a nut 55 and the wing bolt 47. The cap and air vent 54 includes a series of spaced air vents 56 around its periphery for venting filtered blow-by gases from the third filter chamber 41.

A drain plug 61 is provided at the bottom of the oil/air separator 10 for draining accumulated oil 62 within the collection chamber 28 from the oil/air separator 10. An oil return line 64 is provided to return excess accumulated oil from the collection chamber 28 back to the crankcase. A threaded bushing 65 and nut 66 secure the return line 64 to the end cap 15 at a level above the bottom of the collection chamber 28, to allow a predetermined quantity of oil to accumulate in the collection chamber 28 for inspection purposes.

A clear plastic indicator line 68 is mounted at one end of the oil/air separator 10 to provide a visual indication of the level of the accumulated oil 62 within the collection chamber 28. The indicator line 68 is mounted to end cap 16 via fittings 69, 71 and communicates with the secondary filter chamber 34 and the collection chamber 28. Oil from collection chamber 28 collects in sight glass line 68 to indicate the oil level.

FIG. 3 is a top plan view of the oil/air separator 10 illustrated in FIG. 1. The cap and air vent 54 of the third filter chamber 41 is removed to illustrate the mounting of the cross-shaped keeper 52 to the bottom of the cylindrical housing 42 of the third filter chamber 41.

In addition, specifically for Detroit diesel engines, which are well known in the art, a fitting 74 is provided to mount an excess oil line (not shown) from the blower box of the Detroit engine to the oil/air separator 10. Oil blown through this line into the oil/air separator 10 is filtered within the secondary filter chamber 29 before accumulating in the collection chamber 28.

FIG. 4 is an end elevational view of the oil/air separator 10 shown in cut away to illustrate an interior end view of the primary filter chamber 27, the first filter support plate 25, and the lower collection chamber 28.

Referring to FIG. 1, the operation of the oil/air separator 10 is as follows. With an associated internal combustion engine running during normal operation, blow-by gases from the engine crankcase fluctuate into and out of the oil/air separator 10 through the blow-by gas vent tube 21. As the blow-by gases fluctuate through the vent tube 21, the gases enter the primary filter chamber 27 wherein the gases receive their first stage of filtering by the primary filter means 32. The perforations or holes 30 of the first filter support plate 25 are relatively small in dimension as compared to the holes 31 of the second filter support plate 26 in order to restrict partially the passage of the blow-by gases from the primary filter chamber 27 into the collection chamber 28. Such a restriction increases the interaction of the blow-by gases with the filter material, thus enhancing the filtering action of the primary filter means 32. The primary filter means 32 strains the blow-by gases and entraps oil and gas fumes, atomized oil and fuel, and other heavy particulate matter resulting from engine operation. As the oil and gas droplets cling to the fibrous filter material, the droplets condense and coalesce into larger droplets of sufficient weight to fall through the primary filter means and through the holes 30 in the first filter support plate 25 down into the collection chamber 28 to accumulate therein.

The blow-by gases from the primary filter chamber 27, having received their first stage of filtering, enter the collection chamber 28 through the first filter support plate 25 and are directed, as indicated by arrows 70, up through the second filter support plate 27 through the holes 31 therein into the secondary filter chamber 29. The holes 31 in the second filter support plate are sufficiently large to minimize their restrictive effect on the flow of the blow-by gases into the secondary filter chamber 29. Therein, the once filtered blow-by gases receive their second stage of filtering.

The denser or finer fibrous material of filter means 34 further scrubs the blow-by gases to entrap oil and gas vapors, moisture hydrocarbons, soot combustible materials, and other particulate matter carried by the blow-by gases. Such entrapped oil and gas vapors condense and coalesce into droplets, which eventually fall down through the second filter support plate 26 into the collection chamber 28. From the secondary filter chamber 29, the blow-by gases, having twice been filtered, enter the third filter chamber 41 and are filtered by the vertically spaced perforated filter plate baffles 44 prior to venting through the cap and air vent 54. On the vertically spaced filter plate baffles 44, oil and gas droplets form and condense into droplets that will fall down through the third filter chamber 41, down through the secondary filter chamber 29, and into the collection chamber 28. In FIG. 5 is a modified form of the invention. In this modified form, the filter chamber 41a is identical to the filter chamber 41 and the frusto-conical perforated filter plates 44a are identical to filter plates 44. Filter material 44a, however, is interposed in the spaces between the vertically spaced frusto-conical perforated filter plates 45a.

The accumulated oil within the collection chamber 28 can be periodically drained from the collection chamber through removal of drain plug 61. Further, it should be noted that the extent of oil build-up in the collection chamber 28 is an indication of the condition of the piston rings and the general performance of the combustion chamber of the internal combustion engine.

Should a piston ring blow or wear out or other damage occur within the combustion chamber to cause an excess formation of blow-by gases within the crankcase, the oil/air separator 10 receives these excess blow-by gases and filters therefrom the increased amount of oil carried by the gases. The increased amount of oil accumulates within the collection chamber to the point of reaching the oil return line 64, which functions to return the excess oil back through the engine crankcase.

The features and principles of the present invention have been illustrated in the foregoing description of a preferred embodiment thereof. It will be apparent to those skilled in the art that various changes or modifications may be made thereto without departure from the spirit and scope of the invention. All such changes and modifications are intended to be within the scope of the present invention as set forth in the following claims.

I claim:

1. In a vehicle having an internal combustion diesel engine with a crankcase, and vent means for venting blow-by gases from the crankcase to atmosphere, the improvement therein being and oil/air separator comprising:

a housing connected to the vent means, the housing including a top portion, a bottom portion, and end walls enclosing the housing to thereby form an oil/air separator chamber;

inlet flow means in the housing for receiving blow-by gases from the crankcase;

primary filter means in the housing for providing an initial filtering stage for the blow-by gases;

secondary filter means in the housing for providing a secondary filtering stage for the blow-by gases;

outlet means for venting the filtered blow-by gases from the housing to atmosphere about the housing;

a divider extending downwardly from the top portion of the housing to define a primary filter chamber and a secondary filter chamber in the upper portion of the oil/air separator chamber;

filter support means spanning the oil/air separator chamber for supporting the primary and secondary filter means, the filter support means defining a collection chamber in the lower portion of the oil/air separator chamber for collecting oil captured by the primary and secondary filters; and means on the housing for determining the amount of oil accumulated in the collection chamber.

2. The oil/air separator of claim 1, further comprising a third filter means interposed on the housing between the outlet means and the secondary filter means, the third filter means comprising a series of vertically spaced frusto-conical perforated filter plates, and the third filter means including an opening below the frusto-conical perforated filter plates for oil droplets to drop through into the secondary filter means.

3. The oil/air separator of claim 2, further comprising a filter material interposed between the vertically spaced frusto-conical perforated filter plates.

4. The oil/air separator of claim wherein the primary filter means comprises a coarse filter material and the secondary filter means comprises a fine filter material.

5. The oil/air separator of claim 1, wherein the filter support means comprises a perforated plate, with the portion of the perforated plate supporting the primary filter means including small perforations for restricting the flow of blow-by gases therethrough, and with the portion of the perforated plate supporting the secondary filter means including large perforations through which the filtered blow-by gases can flow substantially unrestricted.

6. The oil/air separator of claim 1, wherein the means for determining the amount of oil accumulated in the collection chamber comprises a transparent tube in communication with the collection chamber for providing a visual indication of the amount of oil accumulated in the collection chamber.

7. In a vehicle having an internal combustion engine with a combustion chamber, including a cylinder, a piston, and a piston ring about the periphery of the piston and in contact with the cylinder wall for preventing the passage of blow-by gases from the combustion chamber, a crankcase below the combustion chamber for accumulating oil and wherein blow-by gases from the combustion chamber are received, and vent means for venting the blow-by gases from the crankcase, the improvement therein being an oil/air separator comprising:

a housing for receiving the blow-by gases in the upper portion of the housing;

filter means in the housing for separating and condensing the oil vapors from the blow-by gases as the gases pass into said housing and as the gases pass out of said housing;

a collection chamber in the housing below the filter means for accumulating the condensed oil; and means for draining oil from the collection chamber;

whereby the performance of the combustion chamber in preventing the passage of blow-by gases into the crankcase can be gauged by the amount of accumulated oil within the collection chamber.

8. The oil/air separator of claim 7, further comprising a return line from the collection chamber to the crankcase, the return line in communication with the collection chamber at a predetermined level above the bottom portion of the collection chamber, and in communication with the crankcase at a level below the oil level of the crankcase, whereby, upon a significant increase in the formation of blow-by gases within the crankcase, excess oil carried by the blow-by gases is collected within the collection chamber of the housing and retuned to the crankcase via the return line.

9. In a vehicle having an internal combustion engine with a combustion chamber, including a cylinder, a piston, and a piston ring about the periphery of the piston and in contact with the cylinder wall for preventing the passage of blow-by gases for the combustion chamber, a crankcase below the combustion chamber for accumulating oil and wherein blow-by gases from the combustion chamber are received, and vent means for venting the blow-by bases from the crankcase, the improvement therein being an oil/air separator:

a housing for receiving the blow-by gases;

filter means in the housing for separating and condensing the oil vapors form the blow-by gases;

a collection chamber in the housing below the filter means for accumulating the condensed oil;

means for draining oil for the collection chamber;

a return line from the collection chamber to the crankcase, the return line being in communication with the collection chamber at a predetermined level above the bottom portion of the collection chamber, and in communication with the crankcase at a level below the oil level of the crankcase;

means comprising a first and second filter material and the housing including a perforated filter means support plate spanning the interior of the housing for supporting the first and second filter material above the collection chamber;

said filtering means comprising a first and second filter material and said housing including a perforated filter means support plate spanning the interior of the housing for supporting the first and second filter material above the collection chamber; and whereby the performance of the combustion chamber in preventing the passage of blow-by gases into the crankcase can be gauged by the amount of accumulated oil within the collection chamber and upon a significant increase in the formation of blow-by gases within the crankcase, excess oil carried by the blow-by gases is collected within the collection chamber of the housing and returned to the crankcase via the return line.

* * * * *